Figure 2:
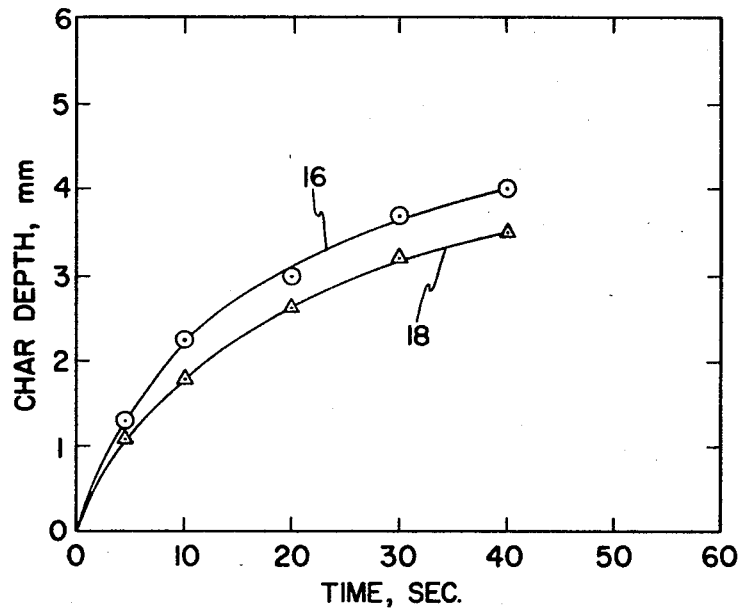

United States Patent

Seader

[15] 3,652,320

[45] Mar. 28, 1972

[54] REDUCTION OF CHAR DEPTH IN ABLATIVE COMPOSITES

[72] Inventor: Junior De Vere Seader, Salt Lake City, Utah

[73] Assignee: University of Utah

[22] Filed: May 31, 1968

[21] Appl. No.: 733,411

[52] U.S. Cl. ............................................................. 117/46
[51] Int. Cl. ............................................................. B44d 1/02
[58] Field of Search ................................. 117/46 CB, 46 CC

[56] References Cited

UNITED STATES PATENTS 3,281,261   10/1966   Lynch ....................................... 117/46
3,351,484   11/1967   Gutzeit ..................................... 117/46
3,356,525   12/1967   Gutzeit ..................................... 117/46

*Primary Examiner*—Alfred L. Leavitt
*Assistant Examiner*—Wm. E. Ball
*Attorney*—Lynn G. Foster

[57] ABSTRACT

Treatment of ablative composite materials with a catalyst comprising a transition metal and/or a transition metal compound to reduce the depth of thermal degradation of the composite by accelerating endothermic reactions in the thermal degradation region of the composite surface to at least partially insulate the remainder of the composite from severe hyperthermal exposure.

4 Claims, 2 Drawing Figures

PATENTED MAR 28 1972 3,652,320

INVENTOR.
JUNIOR DEVERE SEADER
BY
Lynn G. Foster
ATTORNEY

REDUCTION OF CHAR DEPTH IN ABLATIVE COMPOSITES

This invention relates to increasing the heat protective nature of ablative material exposed to high temperatures and particularly to reducing the depth of thermal degradation on the exposed periphery of the ablative material.

Ablative materials are typically composites of a plastic, such as phenolic-formaldehyde resin and a reinforcement cloth which is essentially pure silicon dioxide, although other resin and elastomer materials reinforced with inorganic materials are also applicable. When ablative materials undergo hyperthermal exposure, a complex process occurs which destroys a thin surface layer of the material and protects the bulk from thermal damage. Thermal degradation of the composite involves pyrolysis of the resin, which results in the formation of gaseous products that escape and leave behind a solid residue in the form of a nonuniform cross-linked char sponge and the reinforcement.

For short periods of time, structures may be protected from high heat fluxes and high temperatures by ablative materials. The thickness of the ablative material selected to protect the structure normally depends upon the duration of time in which the structure must be insulated from exposure to high temperature. Previously, the practical application and use of ablative materials have been limited because of the substantial thickness of ablative material required when high temperature exposures have a comparatively long duration.

Since the composite is rapidly charred, the effective thickness of the ablative material will be determined by the depth of penetration of the char into the exposed ablative surface. The char depth is dependent upon its thermal conductivity and upon the rate at which certain endothermic reactions proceed. Thus, the efficiency of the ablative material is affected by the rate at which the endothermic reactions proceed as measured by the depth of the surface char.

Typically, the following classes of reactions are thermodynamically feasible:

1. decomposition of the resin to form porous char and gases,
2. thermal cracking of or reactions among pyrolysis gases as they flow through the porous char to the exposed surface of the ablative composite,
3. char oxidation by the pyrolysis gases, and
4. reactions between the char and reinforcement.

In particular, reactions of class 4 are highly endothermic but have been found to be relatively slow except at very high temperatures. According to the present invention, it has been shown that proper catalysis of the char reinforcement reactions significantly accelerates the reaction rate and lowers the temperature of reaction and thereby increases the protection provided by the ablative material. By way of illustration, the introduction of transition metal compounds into the composite ablative structure causes endothermic reactions, for example, the following endothermic reaction, to be greatly accelerated:

$$SiO_{2(s)} + 3C_{(s)} \longrightarrow SiC_{(s)} + 2CO_{(g)}$$

A significant reduction in the char depth in the exposed ablative material results from the addition of the catalyst.

It is therefore a primary object of the present invention to increase the efficiency of the ablative material.

It is another significant object of the present invention to catalyze reactions between char and silica to exert a greater heat protection and reduce the depth of char formation.

Figure 1:
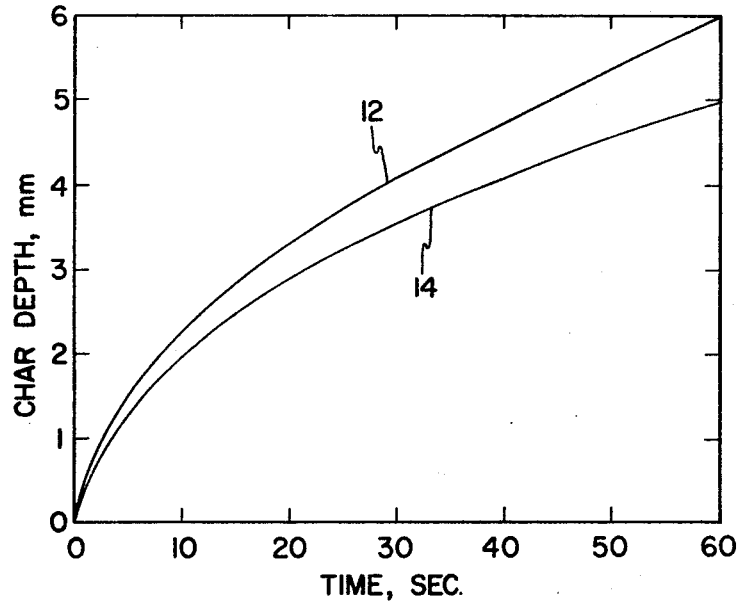

These and other objects and features of the present invention will become more fully apparent from the following description and appended claims taken in conjunction with the accompanying drawings wherein:

FIG. 1 is a mathematically predicted plot of char depth versus time comparing samples with and without the addition of a catalyst, and FIG. 2 is an experimental plot of char depth versus time illustrating the effect of metallic iron on the char depth.

Radiative and/or convective thermal energy, incident upon the surface of ablative composites, may be absorbed by the composite. For composites containing a phenol formaldehyde resin and silicon dioxide reinforcement, the following are examples of classes of chemical reactions that are believed to occur:

1. decomposition (pyrolysis) of the resin to form char and gases:

$$(C_{100}H_{89.4}O_{17.8}N_8)_{m1} \text{ resin} \xrightarrow{1,110°\ F.}$$
$$(C_{100}H_{66.1}O_{11.8}N_2)_{m2} \text{ char} + (x_1H_2 + x_2CO +$$
$$x_3H_2O + x_4CH_4 + x_5C_2H_6 + x_6N_2 + x_7 \text{ organic} +$$
$$x\ x_8CO_2 + x_9O_2 + x_{10} \text{ aromatics}) \text{ gas}; \quad (1)$$

2. thermal cracking of or reactions among pyrolysis gases as they percolate through the insulative porous char to the exposed surface of the ablative composite:

$$CH_{4(g)} \rightleftharpoons C_{(s)} + 2H_{2(g)} \quad (2)$$

$$\text{Benzene}_{(g)} + 9H_{2(g)} \rightleftharpoons 6CH_{4(g)}; \quad (3)$$

3. char oxidation of the pyrolysis gases:

$$C_{(s)} + CO_{2(g)} \rightleftharpoons 2CO_{(g)}, \quad (4)$$

$$C_{(s)} + H_2O_{(g)} \rightleftharpoons CO_{(g)} + H_{2(g)}; \quad (5)$$

4. reactions between the char and reinforcement:

$$SiO_{2\,s} + C_{(s)} \rightleftharpoons SiO_{(g)} + CO_{(g)}, \quad (6)$$
$$SiO_{2\,s} + 2C_{(s)} \rightleftharpoons Si_{(l)} + 2CO_{(g)}, \quad (7)$$
$$SiO_{2\,s} + 3C_{(s)} \rightleftharpoons SiC_{(s)} + 2CO_{(g)}, \quad (8)$$

and subsequent reactions:

$$SiC_{(s)} + 2SiO_{2(s)} \rightleftharpoons 3SiO_{(g)} + CO_{(g)}, \quad (9)$$
$$SiO_{2\,s} + Si_{(l)} \rightleftharpoons 2SiO_{(g)}. \quad (10)$$

The pyrolysis reactions of Class 1 produce a porous char upon the exposed surface of the composite which is quite effective in thermally insulating the remainder of the composite from the high heat-energy external environment. The distance which the porous char extends into the ablative composite in a given time increment depends, largely, upon some or all of the post-pyrolytic chemical reactions.

Of the three classes of post-pyrolytic chemical reactions, those of class 4 are considerably more endothermic than the other classes. Estimated standard heats of reaction for the above reactions at 25° C., are summarized in Table 1:

TABLE 1.

Standard Heats of Reaction for Internal Ablation Reactions.

| Reaction | $H°_{25°C.}$ cal./g.-mole |
|---|---|
| 1 | +265* |
| 2 | +17,889 |
| 3 | −127,154 |
| 4 | +41,220 |
| 5 | +31,382 |
| 6 | +150,214 |
| 7 | (+154,000) |
| 8 | +122,518 |
| 9 | +328,124 |
| 10 | +146,910 |

* cal./g. resin for pyrolysis at 1,000° F.

If it is assumed that one gram of resin undergoes pyrolysis to a char containing 0.45 grams of carbon, which is subsequently consumed according to reaction 8, the ratio of the heat absorbed by the C—SiO$_2$ reactions 6-8 to the heat absorbed by the resin pyrolysis according to reaction 1 is on the order of about 5.8.

An existing computer program (Rivers, VanWyk, Seader, Friedman and Chu, "Effects of Rocket Engine Combustion on Chamber Materials, Part I: One-dimensional Computer Program," Rocketdyne Report AFRPL-IR-65-13, Jan. 1965) based on a detailed mathematical model of the internal chemical ablation processes was utilized to predict the effect of the char-silica reactions (class 4, particularly reaction 8) on the char-depth, time relationship. A typical 70/30 silica phenolic composite was exposed to a heat flux of 44.5 cal./cm.$^2$-sec. (1.14 BTU/in.$^2$-sec.), which was comparable to the magnitude of experimental test fluxes. The results of the calculations are plotted in FIG. 1.

With specific reference to FIG. 1, curve 12 represents the predicted char depth in millimeters at the stated heat flux of 44.5 cal./cm.$^2$-sec. over a time period range of 0 to 60 seconds without the contribution of the char-silica reactions 6–8. Curve 14 represents the predicted char depth in the same material type and under the same conditions including the contribution of the char-silica reaction 8. At a 60-second exposure to the stated heat flux, the predicted char depth reduction is about 16 percent.

Investigation of the kinetics of reactions 6–8 indicate that reactions 6–8 were relatively slow except at very high temperatures. A convenient first order kinetic expression for the depletion of carbon by reactions 6–8 is represented by:

$$-(dC/dt) = 15.5 \exp [20 - (62,500/T)] C$$

where C is the carbon spatial density in g./cm.$^3$, t is the time in hours, and T is the temperature in °R. Table 2 sets forth the calculated times required for 50 percent and 90 percent depletion of carbon over a temperature range of 2,500° F. to 3,100° F. The corresponding equilibrium carbon-monoxide pressure as predicted for reaction 8 is also provided:

TABLE 2.

(Predicted Reaction Times and Equilibrium Carbon-Monoxide Pressure for C—SiO$_2$ Reactions.

| temperature | | Reaction Time, sec. | | PCO** |
|---|---|---|---|---|
| °F. | °C. | 50%* | 90%* | p.s.i.a. |
| 2,500 | 1,371 | 491 | 1,631 | 5.0 |
| 2,600 | 1,427 | 246 | 818 | 9.9 |
| 2,700 | 1,482 | 129 | 429 | 18.9 |
| 2,800 | 1,538 | 70.3 | 234 | 34.7 |
| 2,900 | 1,593 | 39.8 | 132 | 61.4 |
| 3,000 | 1,649 | 23.2 | 77.1 | 105 |
| 3,100 | 1,705 | 14.0 | 46.4 | 175 |

*Depletion of carbon in the presence of excess SiO$_2$ and negligible reverse reaction.

** For reaction *(8).

By catalysis of the silicon carbide formation reaction (reaction 8) with transition-metal-containing compounds, the temperature at which the reaction proceeds is greatly reduced so that the endothermic benefit and corresponding reduction in char depth can be realized. The following examples illustrate the invention.

EXAMPLE I

Silica fabric commercially impregnated with phenolic resin is called "prepreg" in the art. Prepreg samples for use according to this example were made from U.S. Polymeric FM-5204 (high-silica fabric-reinforced prepreg employing a MIL-R-9 299 phenolic resin).

Prepreg layers were cut into two inch squares and No. 200 mesh metallic iron was applied to both sides of the squares comprising the test samples. A suitably uniform covering was achieved by applying the iron with a dry cotton cloth. Samples containing 7, 10 and 15 layers were prepared from prepreg squares. A corresponding number of squares were left untreated with iron to constitute a control sample which, with the stated exception, is treated throughout the procedure in a manner substantially identical with the test sample.

The samples were cured in a Model D-195 laminating press, manufactured by Whitehead and Company. The platens of the laminating press were preheated to 310° F. The samples were each sandwiched between layers of non-heat-sealing, high temperature cellophane in order to protect the platens from excess resin. A pressure of 50 p.s.i.g. was applied simultaneously to both the test and control samples and a temperature of about 300° F. was maintained for one hour.

Disc-shaped samples were cut from each square prepreg sample with a carbon-steel core drill and the discs were exposed to a uniform high energy heat flux of on the order of 45 cal./cm.$^2$-sec. produced by a conventional mercury - xenon lamp. The resulting pyrolyzed disc samples were divided axially and the depth of the char measured both from photomicrographs and with a Bernell scope calibrated in 0.1 mm. units.

A plot of char depth vs. exposure time of a series of samples is illustrated in FIG. 2. With specific reference to FIG. 2, curve 16 represents the progressive char depth, over a time increment of 40 seconds, of control samples without iron but otherwise treated according to Example I. Curve 18 represents a series of test samples run parallel to the samples represented by curve 16. The samples represented by curve 18 were treated as set forth in Example I, including the addition of No. 200 mesh iron. Over most of the region studied, char depth varied with exposure time to the 0.6 power. FIG. 2 shows that, with the use of No. 200 mesh metallic iron, the difference in char depth between the catalyzed and control samples increased with increased exposure time and the percentage of char depth reduction remained essentially constant.

EXAMPLE II

Prepreg layers of the same type used in Example I were rubbed with No. 100 mesh metallic iron in place of the No. 200 mesh iron to prepare a test sample. The test sample and a control sample were processed according to Example I.

EXAMPLE III

The procedure set forth in Example I was repeated except the prepreg layers were rubbed with finely powdered MnO$_2$ in place of the metallic iron.

EXAMPLE IV

The procedure set forth in Example I was repeated except the prepreg layers were rubbed with finely powdered Cr$_2$O$_3$ in place of metallic iron.

EXAMPLE V

The procedure set forth in Example I was repeated except the prepreg layers were rubbed with finely powdered Fe$_2$O$_3$ in place of metallic iron.

EXAMPLE VI

A hand-laid composite sample was prepared by cutting high-purity silica cloth into 2 inch squares. Finely powdered Fe$_2$O$_3$ was uniformly applied to the silica cloth with a dry cotton cloth. Thereafter liquid phenolic resin was painted on the silica with a nylon brush. The resin used was U.S. Polymeric F-502 (A MIL-R-9299 phenolic resin).

As in the examples using prepreg, composites of 7, 10 and 15 layers were made and paired with samples containing no metal compounds.

The composite samples were cured in a laminating press in essentially the same manner as the prepreg curing process set forth in Example I and the preparation and testing of the disc shaped samples was carried out according to the process of Example I.

EXAMPLE VII

The procedure set forth in Example VI was repeated except the finely powdered Fe$_2$O$_3$ was applied to the silica cloth by first suspending the powdered Fe$_2$O$_3$ in acetone. Thereafter, the silica cloth was immersed in the suspension and allowed to dry. The dried silica cloth had a relatively uniform amount of $Fe_2O_3$ over the surface thereof.

EXAMPLE VIII

The procedure set forth in Example VI was repeated except the finely powdered $Fe_2O_3$ was applied to the silica cloth by first suspending the powdered $Fe_2O_3$ in the phenolic resin. When the resin was painted on the cloth as in Example VI, a uniform amount of $Fe_2O_3$ was applied over the entire surface of silica cloth.

The percentage reduction in char depth in the above examples is tabulated in Table 3:

TABLE 3.

(Experimental Char-depth Reduction.*)

| Catalyst Material | Exposure Time, sec. | Char-depth reduction percent |
|---|---|---|
| $Fe_2O_3$ | 10 | 11.2 |
|  | 15 | 11.0 |
|  | 15 | 8.5 |
| $Fe_2O_3$ (hand-laid) | 10 | 5.0 |
|  | 15 | 7.7 |
| $Cr_2O_3$ | 10 | 7.7 |
|  | 12 | 10.0 |
|  | 15 | 21.0 |
|  | 35 | 14.8 |
| $MnO_2$ | 25 | 11.5 |
|  | 35 | 10.7 |
| Fe (No. 100 Mesh) | 10 | 5.5 |
|  | 15 | 12.5 |
|  | 15 | 17.3 |
|  | 45 | 25.6 |
| Fe (No. 200 Mesh) | 5 | 7.7 |
|  | 10 | 18.2 |
|  | 20 | 10.0 |
|  | 30 | 15.8 |
|  | 40 | 12.5 |

*Data are for prepreg samples except where noted for hand-laid.

Without exception, the measured char depths of samples containing transition-metal powders were less than their corresponding control samples. The percentage of reduction, as shown by Table 3, ranged from 5 percent to 25 percent. Metallic iron powder of No. 100 mesh resulted in the greatest char depth reduction, with an average for four tests of 15 percent reduction. The metallic oxides ($MnO_2$, $Cr_2O_3$ and $Fe_2O_3$) averages about 10 percent char depth reduction.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. In a method of reducing the amount of thermal degradation in ablative composite material comprising phenolic resin and silica reinforcement, which is exposed to high heat energy comprising selectively placing a transition metal-containing substance selected from the group consisting of iron, manganese oxide, chromium oxide, and iron oxide, in intimate contact with the ablative composite and absorbing a portion of the heat energy by endothermic reaction occuring within the ablative composite whereby a significant amount of heat energy is absorbed and the formation of char is inhibited.

2. In a method as defined in claim 1 wherein said placing step comprises depositing the transition metal-containing substance within the ablative material which is to be exposed to high heat energy.

3. In a method as defined in claim 1 wherein said placing step comprises mixing the transition metal-containing substance with liquid phenolic resin used to form the ablative material so that the entire resulting ablative composite comprises an essentially uniform distribution of the transition metal-containing substance.

4. In a method of reducing the depth of char formation in ablative composite material comprising phenolic resin and silica reinforcement which is exposed to high heat energy the steps of dispersing a fine powder comprising one of Fe, $Fe_2O_3$, $MnO_2$ and $Cr_2O_3$ in a selected portion of the ablative composite, subjecting the selected portion of the composite to high heat energy and increasing the amount of absorption of the heat energy by catalysis during endothermic reaction between components of the ablative composite.

* * * * *